United States Patent [19]
Nakano

[11] 4,357,828
[45] Nov. 9, 1982

[54] METHOD OF INDICATING A BASIC AIR-FUEL RATIO CONDITION OF AN INTERNAL COMBUSTION ENGINE

[75] Inventor: Jiro Nakano, Okazaki, Japan

[73] Assignee: Toyota Jidosha Kogyo Kabushiki Kaisha, Toyota, Japan

[21] Appl. No.: 183,417

[22] Filed: Sep. 2, 1980

[30] Foreign Application Priority Data

Sep. 4, 1979 [JP] Japan .............................. 54-112384

[51] Int. Cl.³ .......................................... G01M 15/00
[52] U.S. Cl. .................................. 73/117.3; 123/440; 340/53
[58] Field of Search ..................... 73/116, 117.3, 27 R; 123/440; 340/53

[56] References Cited

U.S. PATENT DOCUMENTS 3,581,555 6/1971 Cline .................................. 73/27 R
4,223,644 9/1980 Latsch et al. .................. 123/440 X

*Primary Examiner*—Jerry W. Myracle
*Attorney, Agent, or Firm*—Cushman, Darby & Cushman

[57] ABSTRACT

An average value of an air-fuel ratio correction signal, which is gradually increased or decreased in accordance with output of an exhaust gas sensor for detecting the concentration of a particular component in the exhaust gas, and which is utilized for controlling air-fuel ratio of the mixture supplied to an engine, is generated. Then, the generated average signal is compared with a plurality of predetermined values to discriminate a range in which the average signal is positioned among a plurality of ranges specified by the plurality of predetermined values. Thereafter a signal which represents the discriminated range is produced. This signal energizes an indicator to inform an operator of the basic air-fuel ratio condition of the engine.

8 Claims, 10 Drawing Figures

AIR-FLOW SENSOR
22
WATER TEMPERATURE SENSOR
31
BATTERY
33
THROTTLE POSITION SENSOR
27
ROTATIONAL ANGLE SENSOR
25a
BUFFER
50
BUFFER
51
BUFFER
52
BUFFER
57
BUFFER
60
BUFFER
62
ANALOG MULTIPLEXER
53
A/D CONVERTER
54
INPUT PORT
56
BUFFER
58
INPUT PORT
59
SPEED SIGNAL FORMER
61
ROM
79
RAM
80

METHOD OF INDICATING A BASIC AIR-FUEL RATIO CONDITION OF AN INTERNAL COMBUSTION ENGINE

BACKGROUND OF THE INVENTION

The present invention relates to a method of indicating a basic air-fuel ratio condition of an internal combustion engine which has an air-fuel ratio feedback control system.

There presently exists an engine equipped with an air-fuel ratio feedback control system which controls an air-fuel ratio of the mixture supplied to the engine in response to an air-fuel ratio correction signal. The air-fuel ratio correction signal is gradually increased or decreased in accordance with an output of an exhaust gas sensor which detects the concentration of a particular component contained in the exhaust gas.

In such an engine, a basic air-fuel ratio, which is equivalent to an air-fuel ratio of the engine when the air-fuel ratio feedback control operation is stopped, is adjusted by detecting the voltage level or the digital value of the air-fuel ratio correction signal, and by setting a mixture control mechanism, for example a by-pass air adjusting screw of an air-flow sensor, so that the voltage or digital value of the air-fuel ratio correction signal approaches a predetermined value.

If the engine employs an analog type air-fuel ratio feedback control system, the adjustment of the basic air-fuel ratio is carried out by setting the by-pass air adjusting screw of the air-flow sensor so that the voltage of the air-fuel ratio correction signal approaches a predetermined voltage level. Therefore, at the adjustment of the basic air-fuel ratio of the engine having an analog controlled air-fuel ratio feedback system, it is necessary to use a voltmeter or another voltage measuring device for measuring the voltage level of the air-fuel ratio correction signal.

On the other hand, in an engine employing a digital controlled air-fuel ratio feedback system using a microcomputer, the air-fuel ratio correction signal is binary coded and is not measured by a voltmeter. Therefore, in the engine having the digital controlled air-fuel ratio feedback system, the binary coded signal stored in the microcomputer must be taken out and must be converted into a d-c voltage using a digital-analog converter (D/A converter), to adjust the basic air-fuel ratio, thus requiring a very expensive and complicated device, in addition to the voltmeter.

SUMMARY OF THE INVENTION

It is, therefore, an object of the present invention to provide a method of indicating a basic air-fuel ratio condition whereby, if applied to an engine having an analog controlled air-fuel ratio feedback system, a voltage measuring device, such as a voltmeter, is not necessary for adjusting the basic air-fuel ratio, and; if applied to an engine having a digital controlled air-fuel ratio feedback system, a complicated and expensive device, such as a D/A converter for converting the binary coded signal to the voltage signal, in addition to a voltage measuring device, is not necessary for adjusting the basic air-fuel ratio.

According to the present invention, a method of indicating a basic air-fuel condition of an internal combustion engine comprises the steps of: generating a signal having an average value of an air-fuel ratio correction signal which is gradually increased or decreased in accordance with the output of an exhaust gas sensor for detecting the concentration of a predetermined component contained in the exhaust gas, and which is utilized for controlling air-fuel ratio of the mixture supplied to the engine; comparing the generated average signal with a plurality of predetermined values to discriminate a range in which the average signal is positioned among a plurality of ranges specified by the plurality of predetermined values; and, producing a signal which represents the discriminated range and energizes an indicator to inform an operator of the basic air-fuel ratio condition of the engine.

The above and other related objects and features of the present invention will be apparent from the following description of the present invention, with reference to the accompanying drawings, as well as with reference to the appended claims.

DETAILED DESCRIPTION OF THE PREFERRED EMBODIMENTS

Figure 1:
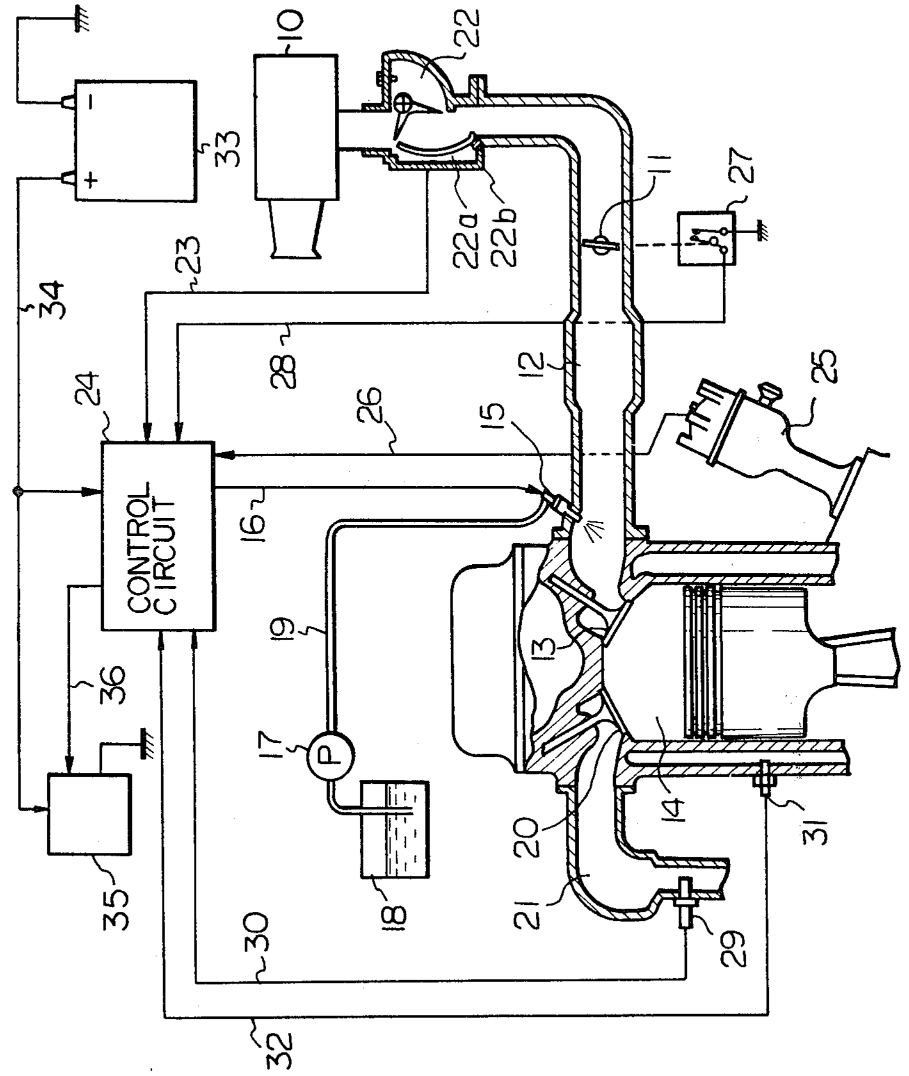
FIG. 1 is a schematic diagram of an internal combustion engine according to an embodiment of the present invention.

Referring to FIG. 1, which is a schematic diagram of an internal combustion engine having an electronic fuel injection control system as an embodiment according to the present invention, the flow rate of air sucked via an air cleaner 10 is controlled by a throttle valve 11, which is interlocked to an accelerator pedal. The sucked air is introduced into a combustion chamber 14 via a surge tank 12 and an intake valve 13. A fuel injection valve 15 is installed in the intake system in the vicinity of the intake valve 13, and is opened and closed to inject the compressed fuel in response to electric input pulse signals sent via a line 16. A fuel pump 17 compresses the fuel in a fuel tank 18 and sends the fuel to the fuel injection valve 15 via a conduit 19. The exhaust gas, after being burned in the combustion chamber 14, flows via an exhaust valve 20 and an exhaust manifold 21, and is emitted into the open air via a catalitic converter which is not illustrated.

An air-flow sensor 22 is provided in the intake system between the air cleaner 10 and the throttle valve 11 to detect the flow rate of the sucked air, and sends an output signal to a control circuit 24 via a line 23. A rotational angle sensor 25*a* (refer to FIG. 2) mounted in a distributor 25 produces a pulse signal every time a crank shaft of the engine rotates by a predetermined angle; this signal is sent to the control circuit 24 via a line 26.

A throttle position sensor 27 interlocked to the throttle valve 11 sends a signal to the control circuit 24 via a line 28, the signal indicating that the throttle valve 11 is at the idling position. An exhaust gas sensor 29 installed in the exhaust manifold 21 detects the concentration of a particular component, for example, the concentration of oxygen contained in the exhaust gas, and determines whether the air-fuel ratio of the mixture introduced into the combustion chamber 14 is on the rich side or the lean side with respect to the stoichiometric air-fuel ratio, and sends the output signal to the control circuit 24 via a line 30.

The output signal of a water temperature sensor 31, which detects the temperature of coolant of the engine, is fed to the control circuit 24 via a line 32. A battery 33 applies a d-c voltage to the control circuit 24 via a line 34. The control circuit 24 feeds output signals via a line 36 to an indicator 35 which consists of a light-emitting diode or an incandescent lamp.

Figure 2:
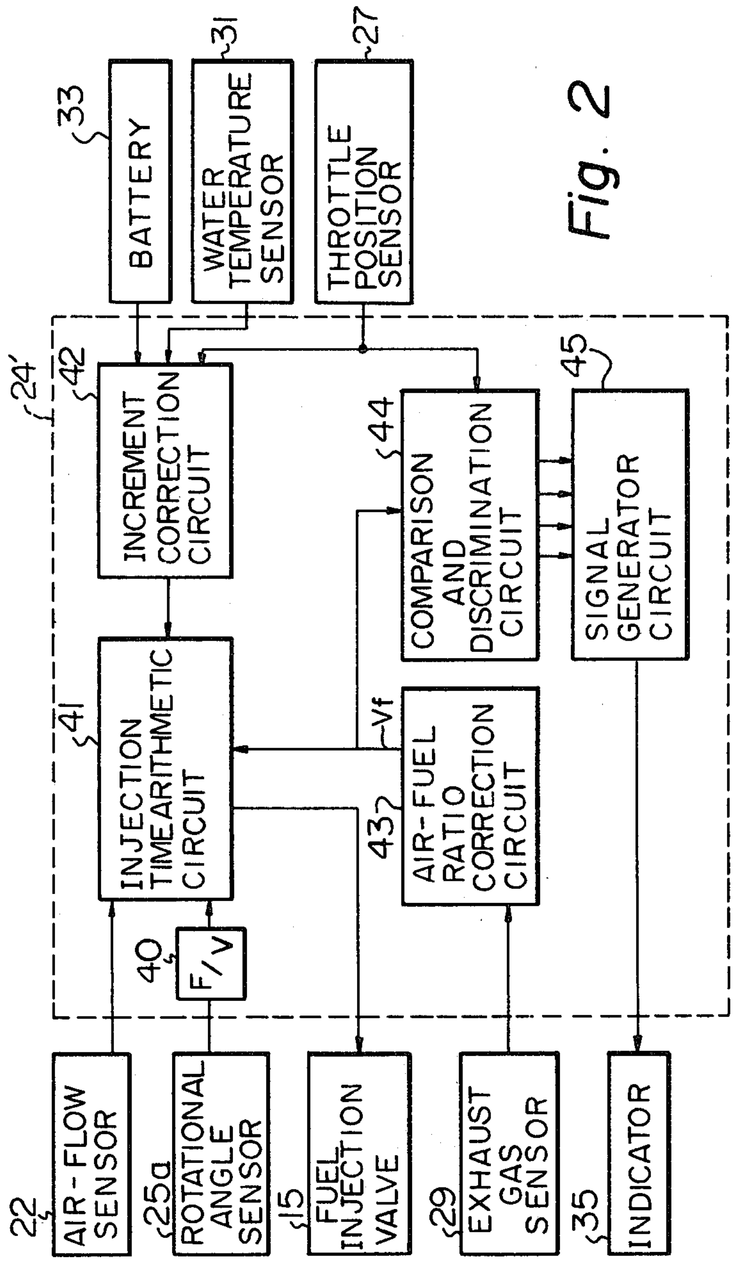
FIG. 2 is a block diagram illustrating one example of a control circuit of FIG. 1.

FIG. 2 is a block diagram illustrating an example of the control circuit 24 of FIG. 1. The control circuit in this case is of the analog type, in which an air-flow sensor 22, a rotational angle sensor 25*a*, a fuel injection valve 15, an exhaust gas sensor 29, an indicator 35, a battery 33, a water temperature sensor 31, and a throttle position sensor 27 are quite equal to those of FIG. 1.

Pulse signals produced by the rotational angle sensor 25*a* every time the crank shaft turns a predetermined angle or, in other words, pulse signals having a frequency which is proportional to the rotational speed of the engine, are converted by a frequency-voltage converter (F/V converter) contained in the control circuit 24' into voltage signals which are proportional to the rotational speed N, and are fed to an injection time arithmetic circuit 41. On the other hand, the air-flow sensor 22 sends an intake amount signal to the injection time arithmetic circuit 41, the intake amount signal representing the amount Q of the air supplied into the engine.

An increment correction circuit 42 calculates an increment correction coefficient $\gamma$ of the fuel injection time based upon a terminal voltage of the battery 33, a signal related to the temperature of coolant detected by the water temperature sensor 31, and information detected by the throttle position sensor 27 with regard to whether the throttle valve 11 is at the idling position or not, and sends a signal corresponding to a calculated value to the injection time arithmetic circuit 41. An air-fuel ratio correction circuit 43 detects whether the air-fuel ratio of the engine is on the rich side or on the lean side with respect to the stoichiometric condition, relying upon a voltage signal sent from the exhaust gas sensor 29, and the circuit produces such an analog air-fuel ratio correction signal Vf that the air-fuel ratio of the mixture gas fed to the combustion chamber 14 approaches the stoichiometric air-fuel ratio, and sends the signal Vf to the injection time arithmetic circuit 41. Construction of the air-fuel ratio correction circuit 43 has been well known and consists, in many cases, of a comparator which compares an output signal of an exhaust gas sensor 29 with a predetermined value, and an integrator which integrates the compared outputs with respect to time.

The injection time arithmetic circuit 41 calculates a basic injection time $\tau_0$ of fuel in accordance with the following relation, based upon the rotational speed signal, intake amount signal and a predetermined constant K.

$$\tau_0 = K \cdot (Q/N)$$

Then, relying upon the increment correction coefficient signal and the air-fuel ratio correction signal, the actual injection time $\tau$ is calculated in accordance with the following relation, and an output signal corresponding to the calculated result is fed to the fuel injection valve 15.

$$\tau = \tau_0 \cdot \gamma \cdot Vf = K \cdot (Q/N) \cdot \gamma \cdot Vf$$

Constructions of the injection time arithmetic circuit 41 and the increment correction circuit 42 are well known. Since their constructions have no direct relation to the gist of the present invention, they are not illustrated in this specification.

Figure 3:
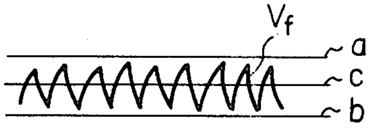
FIG. 3 illustrates wave-forms of the air-fuel ratio correction signal in the control circuit of FIG. 2.

The air-fuel ratio correction signal Vf from the air-fuel ratio correction circuit 43 is also fed to a comparison and discrimination circuit 44 which has two reference voltages a and b with which the air-fuel ratio will be compared to discriminate whether the relation is (1) $Vf > a$, (2) $a \geqq Vf \geqq b$, or (3) $b > Vf$. The circuit 44 selectively sends a signal corresponding to the discriminated result to a signal generator circuit 45. FIG. 3 illustrates wave forms of the air-fuel ratio correction signal Vf, the reference voltages a and b, and the voltage c which corresponds to the stoichiometric air-fuel ratio. The comparison and discrimination circuit 44 sends a signal which is different from the above-mentioned discriminated result in the signal generator circuit 45 when the control circuit 24' is not effecting the feedback control of air-fuel ratio, i.e., when the open-loop control is effected, or when the throttle position sensor 27 has detected that the throttle valve 11 is at the idling position.

Figure 4:
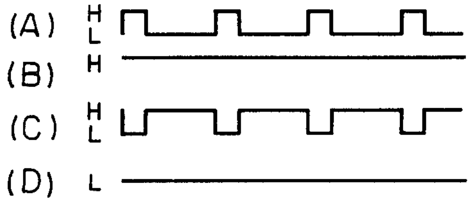
FIG. 4 illustrates wave-forms of the indicating signal produced by the control circuits of FIG. 2 and FIG. 5.

The signal generator circuit 45 produces indicating signals as illustrated FIG. 4(A), (B), (C) and (D) depending upon the signals from the comparison and discrimination circuit 44, and sends them to the indicator 35. Namely, when $Vf > a$, a signal having a duty cycle of $\frac{1}{4}$ as illustrated in FIG. 4(A), is fed to the indicator 35. When $a \geqq Vf \geqq b$, a signal which is always maintained at the high level state, as illustrated in FIG. 4(B), is fed to the indicator 35. When $b > Vf$, a signal having a duty cycle of $\frac{3}{4}$ as illustrated in FIG. 4(C), is fed to the indicator 35. In the case of the open-loop control or when the throttle valve 11 is not at the idling position, a signal which is always maintained at the low level state, as illustrated in FIG. 4(D), is fed to the indicator 35. An incandescent lamp or a light-emitting diode is turned on while a signal of the high level is being supplied, and turned off when the supplied signal changes to the low level.

To adjust the basic air-fuel ratio, the by-pass air adjusting screw 22*b*, which passes through a by-pass passage 22*a* of the air-flow sensor 22, should be turned while monitoring the indicator 35 so that it is continuously lit. The adjustment can be easily performed, since the duty cycle for turning the indicator 35 on varies depending upon the directions of deviation of the air-fuel ratio correction signal Vf. The indicator 35 is not turned on when the openloop control is being effected or when the throttle valve 11 is not located at the idling position. This is because, in such cases, the air-fuel ratio collection signal Vf undergoes great variation, and makes it difficult to precisely adjust the basic air-fuel ratio. When the analog-type control circuit 24' is used as mentioned above, the basic air-fuel ratio can be very easily adjusted without the need of using a voltage measuring device such as a voltmeter.

Figures 5, 5A, 5B:
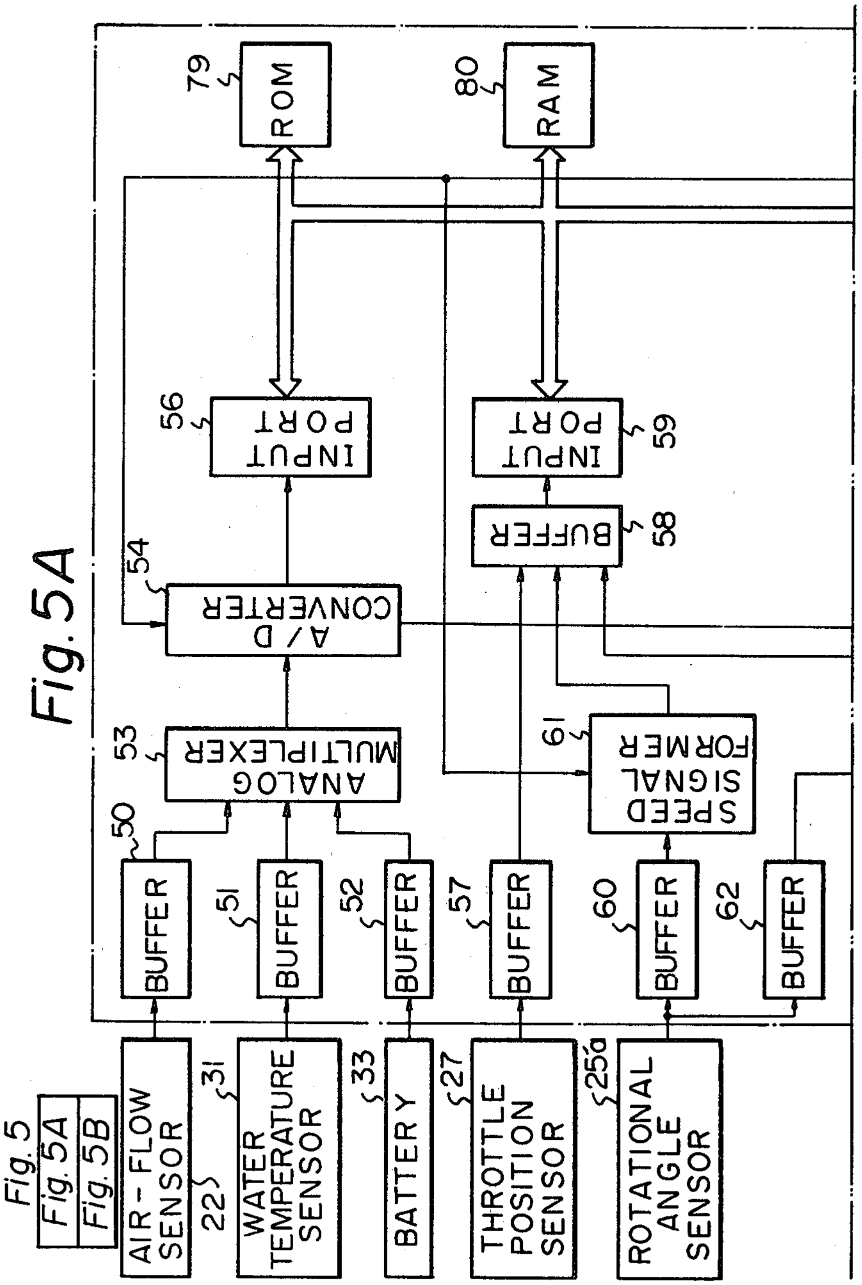
FIGS. 5A and 5B are a block diagram illustrating another example of the control circuit of FIG. 1.
Figure 5B:
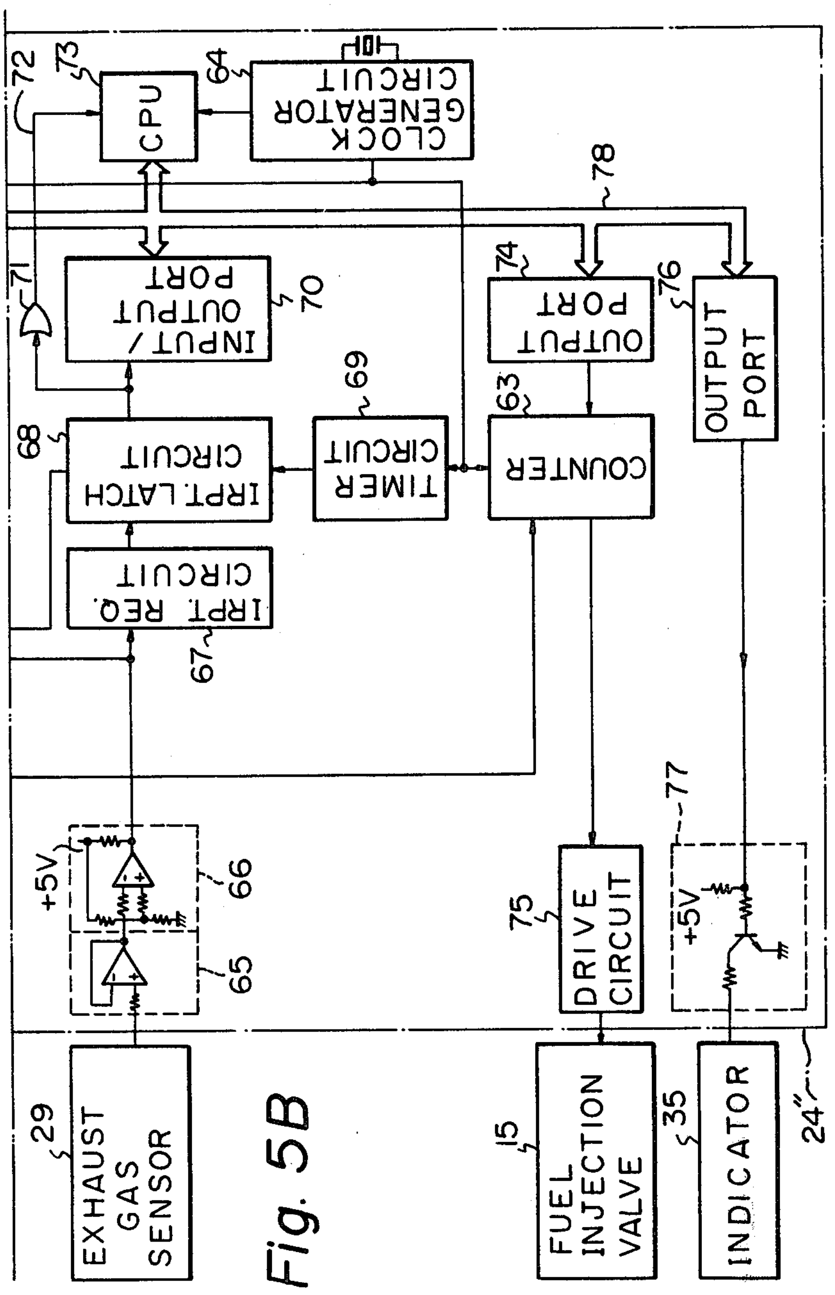

FIG. 5 is a block diagram illustrating another example of the control circuit 24 of FIG. 1. The control circuit 24″ in this case is of the digital type employing a microcomputer. In FIG. 5, an air-flow sensor 22, a water temperature sensor 31, a battery 33, a throttle position sensor 27, an exhaust gas sensor 29, a fuel injection valve 15, and an indicator 35 are quite the same as those of FIG. 1. In this case, however, the rotational angle sensor 25′ produces a pulse every time the crank shaft turns a relatively narrow angle of, for example, 30°, so that the rotational speed can be detected, as well as a pulse every time the crank shaft turns an angle of 360°, to establish a timing for injecting the fuel, and sends these pulses to the control circuit 24″.

Output signals of the air-flow sensor 22, the water temperature sensor 31, and the battery 33 are fed to an analog multiplexer 53 via buffers 50, 51 and 52, each consisting of a low-pass filter and an amplifier. Among these signals, a given signal is selected and is sent to an analog-digital converter (A/D converter) 54. A digital signal which is converted by the A/D converter 54 is fed to an input port 56 and is held therein.

A signal which is produced by the throttle position sensor 27 and which indicates whether the throttle valve 11 is at the idling position or not, passes through a buffer 57 consisting of a low-pass filter and a switching transistor and a buffer 58, and is fed to an input port 59 and is held therein. A pulse produced by the rotational angle sensor 25*a*′ every time the crank shaft rotates an angle of 30° is fed to a speed signal forming circuit 61 via a buffer 60 which is constructed in the same manner as the buffer 57, and a pulse which is produced after every time the crank shaft has rotated by an angle of 360° is fed to a counter 63 via a buffer 62 which is constructed in the same manner as the buffer 57. The speed signal forming circuit 61 has a gate that will be opened and closed by a pulse having a pulse width corresponding to the crank angle of 30°, and a counter for counting clock pulses that are produced by a clock pulse generator circuit 64 and that pass through the above gate. The speed signal forming circuit 61 produces a speed signal having a value which corresponds to the rotational speed of the engine. The speed signal is fed to the input port 59 via the buffer 58, and is held therein.

A signal from the exhaust gas sensor 29 is fed to a comparator circuit 66 via a voltage follower circuit 65 for matching the impedance of the sensor 29 to that of the comparator circuit 66, and is compared with the reference voltage, thereby to form a rich signal "1" or a lean signal "0". The rich or lean signal is then fed to the input port 59 via the buffer 58 and is held therein. An interrupt signal which is necessary at an inversion point between the rich signal and the lean signal is produced by an interrupt request circuit 67, and is fed to an interrupt latching circuit 68.

The interrupt latching circuit 68 further receives a signal which is sent from the A/D converter 54 and which indicates that the A/D conversion has finished, and a signal which is produced by a timer circuit 69 every time a predetermined period of time passes. The output of the interrupt latching circuit 68 is fed to an input/output port 70, as well as to an OR circuit 71. The output of the OR circuit 71 is sent to a central processing unit (CPU) 73 via an interrupt request line 72. Upon receipt of the interrupt request via the interrupt request line 72, the CPU 73 searches the input/output port 70 for the kind of interruption.

An output signal corresponding to an injection time $\tau$ of the fuel injection valve 15 is fed from the CPU 73 to an output port 74, and a value of the output signal is set in a counter 63 at a predetermined timing. The counter 63 is a down counter whose output is inverted to the high level by a pulse of the rotational angle sensor 25*a*′ produced every time the crank rotates by 360°. Then, the counter 63 subtracts its contents one by one upon the receipt of each clock pulse from a clock pulse generator circuit 64. When the contents reaches zero, the output of the counter 63 is inverted to the low level. Therefore, the output of the counter 63 serves as an injection signal having a duration equal to the injection time $\tau$, and is fed to the fuel injection valve 15 via a drive circuit 75.

An indicating signal of 1 bit is fed to the output port 76. When this signal has a logical level of "1", the indicator 35 is energized via a drive circuit 77. When the signal has a logical level of 37 0", the indicator 35 is deenergized.

The input ports 56 and 59, the input/output port 70, and the output ports 74 and 76 are connected via a bus 78 to the CPU 73, to a read-only memory (ROM) 79 and to a random access memory (RAM) 80. Although not illustrated in FIG. 5, the microcomputer will further be provided with an input/output control circuit and a memory control circuit in a customary manner. The ROM 79 stores an interrupt processing program, such as a fuel injection time arithmetic program, air-fuel ratio correction processing program and program for processing the indication of the basic air-fuel ratio condition related to the present invention, as well as various data necessary for the arithmetic operation, as will be mentioned later.

Figure 6:
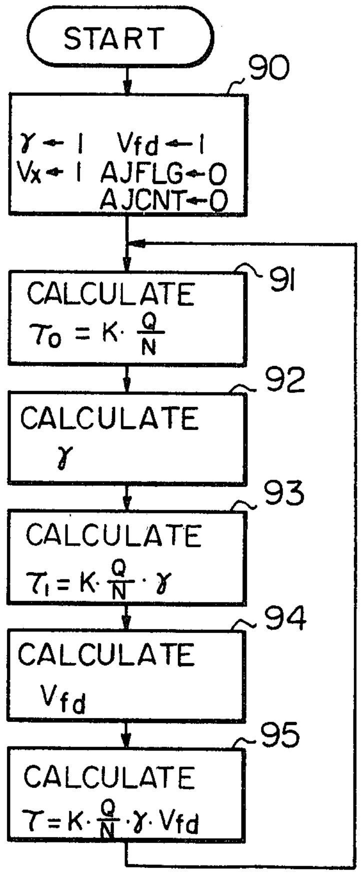
FIGS. 6, 7, 8 and 9 are flow charts illustrating parts of programs of a microcomputer in the control circuit of FIG. 5.

The contents for processing of the microcomputer and the operation of the embodiment are illustrated below with reference to flow charts illustrated in FIGS. 6 to 9. FIG. 6 illustrates a main routine for the arithmetic operation of the fuel injection time. When the power supply is applied to the control circuit 24″, an initial value is given to the RAM 80 at a point 90. Namely, "1" is written as the increment correction coefficient $\gamma$ which is based upon the temperature of the coolant, the terminal voltage of the battery and other detection signals, "1" is written as a feedback correction coefficient Vfd of the air-fuel ratio, "1" is written as an average value Vx of the feedback correction coefficient, "0" is written as a flag AJFLG for adjusting the basic air-fuel ratio, which flag consists of 2 bits, and "0" is set in a software counter AJCNT for adjusting and indicating the basic air-fuel ratio. This software counter consists of a temporarily storing memory which performs the counting operation based upon the program processing. Then, at a point 91, the basic injection time $\tau T_0$ is calculated utilizing an intake amount signal and a speed signal according to $\tau_0 = K \cdot (Q/N)$, where Q represents an amount of the intake air, N represents a rotational speed, and K represents a predetermined constant. At a point 92, the CPU 73 calculates an increment correction coefficient $\gamma$ which is determined by the temperature of the coolant, terminal voltage of the battery, or the temperature of the intake air or the atmospheric pressure, which is not discussed in this embodiment. For example, when the temperature of the coolant is low, the increment correction coefficient $\gamma$ is calculated so that the duration of the signals for driving the fuel injection valve is increased. Thus, the feeding amount of the fuel is increased when the engine is warmed up. When the terminal voltage of the battery is small, on the other hand, the increment correction coefficient $\gamma$ is calculated so that the duration of the signals for driving the fuel injection valve is increased so as to compensate for the increasing of the ineffective injection time of the fuel injection valve. At a point 93, the basic injection time $\tau_0$ is multiplied by the increment correction coefficient $\gamma$ and, thereby, an increased injection time $\tau_1=\tau_0\cdot\gamma$ is obtained. At a point 94, the integration operation to increase or decrease the feedback correction coefficient Vfd after every predetermined period of time relying upon the rich signals and lean signals from the exhaust gas sensor 29 is performed. Furthermore, at the point 94, when the exhaust gas sensor 29 is not properly operating, the feedback correction coefficient Vfd is maintained at "1", namely Vfd=1, so that the air-fuel ratio is controlled by the open-loop. At a point 95, the operation for multiplying the injection time $\tau_1$ by a feedback correction coefficient Vfd is carried out, and then, the data which corresponds to the following calculated fuel injection time $\tau$ is fed to the output port 74.

$$\tau=\tau_1\cdot Vfd=K\cdot(Q/N)\cdot\gamma\cdot Vfd$$

After the operation by the point 95 is finished, the program is returned again to the point 91 to repeat the same operation. The above-mentioned arithmetic operation has been widely known, and its details are not mentioned in this specification.

Figure 7:
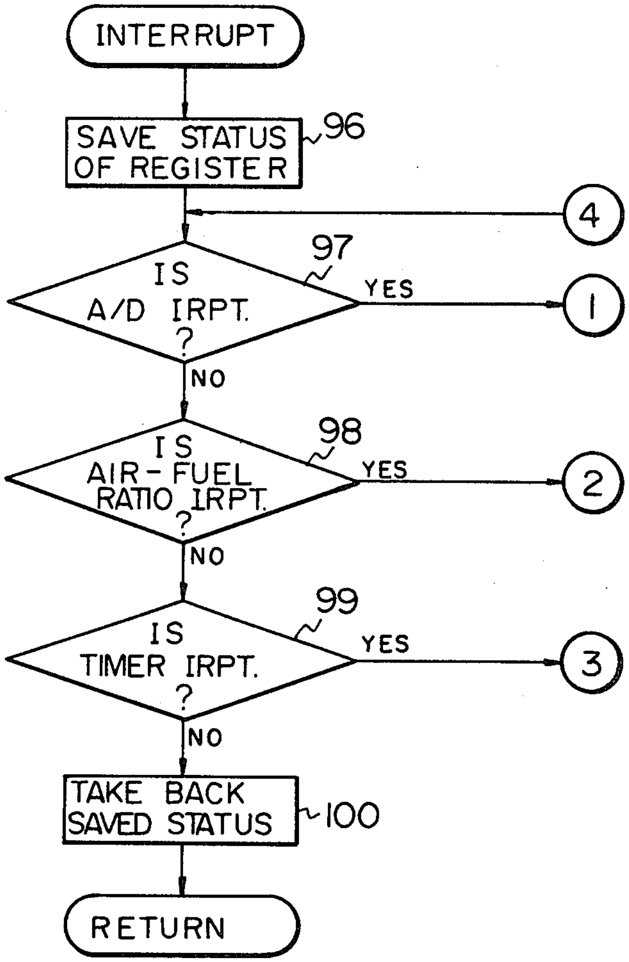
Figure 8:
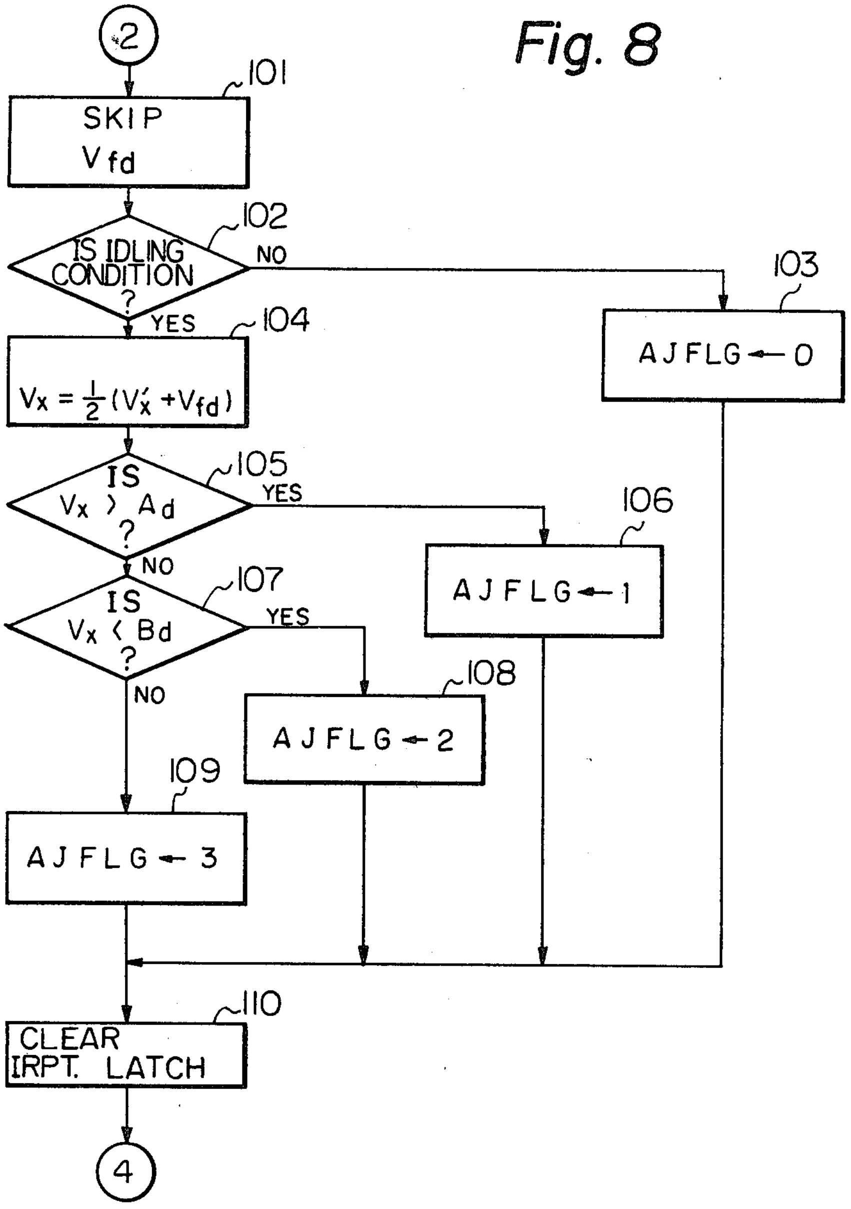
Figure 9:
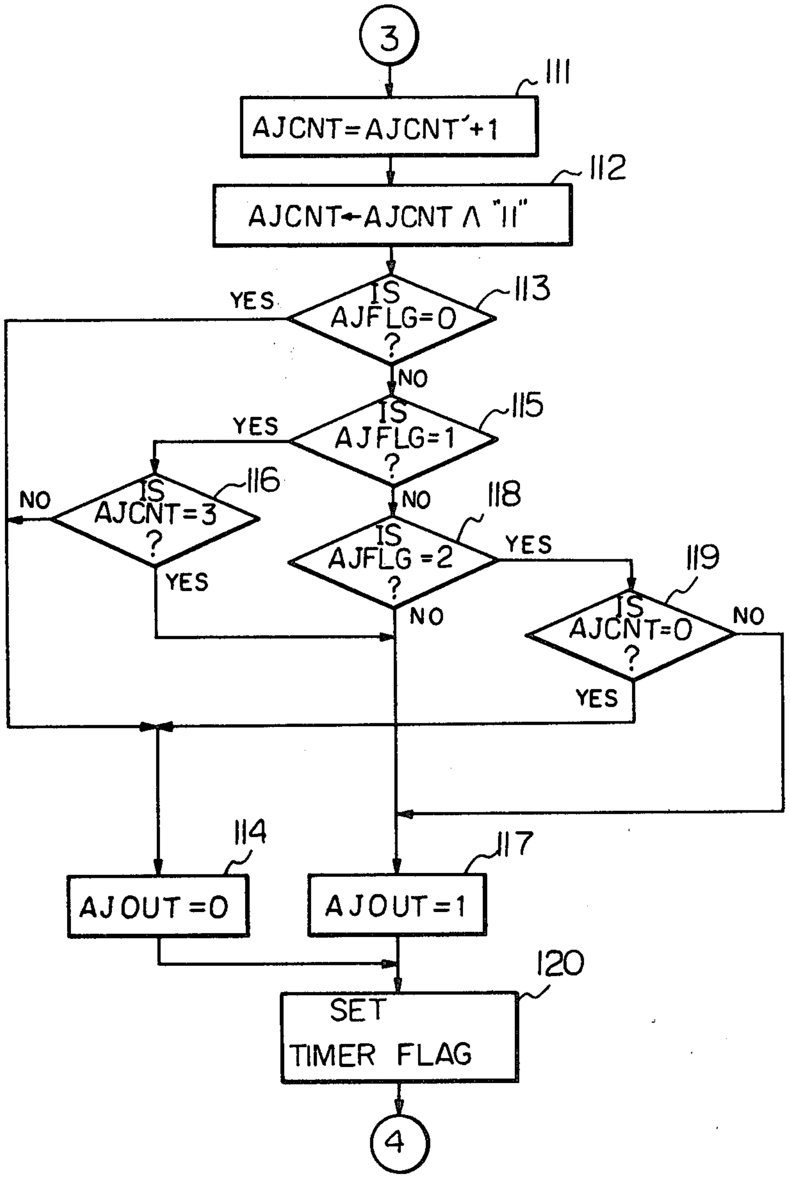

When an interrupt request signal is produced via the interrupt latching circuit 68, the CPU 73 executes the interrupt processing as illustrated in FIGS. 7 to 9. Namely, as the interrupt request signal is generated, the CPU 73 operates so that the contents of the program counter now being executed are stored in the RAM 80, changes the contents of the program counter into a value for effecting a point 96 of FIG. 7, and executes the operation of the point 96. At the point 96, the contents of a general-purpose register are temporarily transferred to the RAM 80, in order to prevent the contents of the register from being lost. Then, at a point 97, whether the request for interrupt was generated by the completion of the conversion operation of the A/D converter 54 or not is discriminated. If the request is by the completion of the A/D conversion, the CPU 73 departs from this program to a routine 1 for processing the A/D converted data. The routine for processing the A/D converted data has no relation to the present invention, and thus, is not illustrated hereinafter. If the request for interrupt is not caused by the completion of the A/D conversion, the program proceeds to a next point 98. At the point 98, whether the interrupt is caused by the air-fuel ratio interrupt, i.e., the interrupt by an inversion point signal which is generated at an inversion point between the rich signal and the lean signal from the exhaust gas sensor 29, is discriminated. If it is the air-fuel ratio interrupt, the program is transferred to a point 2 of the air-fuel ratio processing interrupt routine illustrated in FIG. 8. If it is not the air-fuel ratio interrupt, the program proceeds to a next point 99. At the point 99, whether the interrupt is caused by a request from a timer or not is discriminated. This timer request for interrupt occurs every time a predetermined period passes. If it is the request for timer interrupt, the program is transferred to a point 3 of the timer interrupt routine illustrated in FIG. 9. When the processing of one of the above-mentioned interrupt routines is finished, the program is returned to a point 4, whereby whether the other interrupt routines should be effected or not is discriminated. After the processing of all the requested interrupt routines have finished, the program advances to a point 100, where the saved contents in the general-purpose register and in the program counter are taken back from the RAM 80, and then, the program is returned to the main routine.

Next, the routine for processing the air-to-fuel ratio interrupt is illustrated with reference to FIG. 8. First, at a point 101, CPU 73 detects via the input port 59 whether the signal from the exhaust gas sensor 29 is inverted from the rich signal to the lean signal or vice versa, and effects a so-called "skipping processing" to abruptly increase or decrease the feedback correction coefficient Vfd at the moment of inversion. Then, at a point 102, CPU 73 discriminates whether the engine is in the idling condition or not, based upon the signal from the throttle position sensor 27. When the throttle position sensor 27 detects that the engine is not in the idling condition, i.e., the throttle valve 11 is not at the idling position, the program proceeds to a point 103 where the flag AJFLG for adjusting the basic air-fuel ratio is set to "0" ("00" in binary code). This is effected in order that the basic air-fuel ratio is not attained except under the idling condition.

When the engine is in the idling condition, the program proceeds to a point 104 where the feedback correction coefficients Vfd are averaged to find an average value Vx. By using the average value Vx' obtained in the previous processing cycle and stored in the RAM 80, the average value Vx is calculated according to the following relation, $$Vx=\tfrac{1}{2}(Vx'+Vfd)$$

At a next point 105, the average value Vx is compared with a reference value Ad of the upper side. When $Vx>Ad$, the program proceeds to a point 106 where the flag AJFLG is set to "1" ("01" in binary code). When $Vx\leqq Ad$, the program proceeds to a point 107 wherein the average value Vx is compared with a reference value Bd of the lower side. When $Vx<Bd$, the program proceeds to a point 108 where the flag AJFLG is set to 2 ("10" in binary code). When $Vx\geqq Bd$, the program proceeds to a point 109 where the flag AJFLG is set to "3" ("11" in binary code). Owing to the above-mentioned routine processing, a predetermined value is stored in the flag AJFLG depending upon the magnitude of the reference values Ad, Bd with which are compared the average value Vx. At a point 110, then the air-fuel ratio interrupt request signal which has been stored in the interrupt latching circuit 68 is cleared, whereby the program is returned to the point 4 of FIG. 7. In another embodiment, the feedback correction coefficients Vfd is directly compared with reference values A'd and B'd, instead of the average value Vx. Therefore, in this embodiment, processing at the point 104 is omitted.

Next, the routine for processing the timer interruption is illustrated with reference to FIG. 9. When a request for timer interrupt is produced every time a predetermined time interval passes, for example, every time 50 milliseconds passes, and when the request is detected at the point 99 of FIG. 7, the processing of a point 111 of FIG. 9 is executed. At the point 111, the content AJCNT of the counter which controls the indication of the basic air-fuel ratio condition is increased by one as compared with the previous value AJCNT'. Then, at a point 112, in order to draw only the least significant two bits of AJCNT, logical product operation of the least significant two bits and the binary coded "11" is executed. Then, at a next point 113, whether the AJFLG is "0" or not is discriminated. If AJFLG=0, the program advances to a point 114 where an indicating signal AJOUT of one bit is rendered to be always "0" and is fed to the output port 76. This corresponds to the signal illustrated in FIG. 4(D). If AJFLG=1, the program advances to a point 116. At the point 116, whether the least significant two bits of the AJCNT is "3" ("11" in binary code) or not is discriminated. Only when AJCNT=3, the program proceeds to a point 117 so that the indicating signal AJOUT becomes "1". In other cases, i.e., when the least significant bits of AJCNT are "00", "01" or "10", the program proceeds to the point 114 where AJOUT is rendered to be "0". Therefore, when AJFLG=1, namely when Vx>Ad, the indicating signal AJOUT possesses a duty cycle of $\frac{1}{4}$, which is equivalent to the wave form illustrated in FIG. 4(A). When AJFLG is not 1, the program advances to a point 118. At the point 118, whether the AJFLG is "2" or not is discriminated. When AJFLG=2, the program preceeds to a point 119 wherein whether the least significant two bits of the content AJCNT of the above-mentioned counter is "0" ("00" in binary code) or not is discriminated. When AJCNT=0, the program advances to the point 114 where AJOUT is rendered to be "0". When AJCNT is not "0", i.e., when the least significant two bits of AJCNT are "01", "10" or "11" in binary code, the program advances to the point 117 where the AJOUT becomes "1". Therefore, when AJFLG=2, i.e., when Vx<Bd, the indicating signal AJOUT assumes a duty cycle of $\frac{3}{4}$, as illustrated in FIG. 4(C). When it is so discriminated in the point 118 that AJFLG is not 2, and thus, the AJFLG is "3", the program proceeds to the point 117 where the indicating signal AJOUT becomes always "1". Namely, this state corresponds to the case when Bd≦Vx≦Ad, whereby an indicating signal becomes as illustrated in FIG. 4(B). When the indicating signal AJOUT is determined by the point 114 or the point 117, and is sent to the output port 76, the program is allowed to advance to a point 120 where a timer flag is set to execute the integration of the feedback correction coefficients Vfd at the point 94 in the main routine illustrated in FIG. 6. Thereafter, the program is allowed to advance to the point 4 of FIG. 7.

Owing to the aforementioned processing of interrupt, requests, the indicating signal AJOUT is sent to the output port 76. When AJOUT=1, the indicator 35 is energized via the drive circuit 77 and a light-emitting diode, for example, is turned on. When AJOUT=0, the light-emitting diode is turned off.

In adjusting the basic air-fuel ratio, therefore, when the indicator 35 consisting, for example, of a light-emitting diode is flashing at an on-duty cycle of $\frac{1}{4}$, it means that the basic air-fuel ratio is one the lean side. In this case, therefore, the by-pass air adjusting screw 22*b* of the air-flow sensor 22 is so turned that the amount of the intake air flowing through the bypass passage 22*a* is reduced. When the light-emitting diode is flashing at an on-duty cycle of $\frac{3}{4}$, on the other hand, it means that the basic air-fuel ratio is on the rich side. In this case, the by-pass air adjusting screw 22*b* is so turned that the amount of the intake air flowing through the by-pass passage 22*a* is increased, so that the light-emitting diode is finally turned on continuously. When the light-emitting diode does not turn on at all, the exhaust gas sensor 29 is inoperative or is in an abnormal condition, or the throttle valve 11 is not at the idling position. In this case, it is desired that the basic air-fuel ratio not be adjusted.

According to the method of the present invention employing the digital control circuit 24", which relies upon a microcomputer as illustrated in the foregoing, the basic air-fuel ratio can be very easily adjusted without requiring any particular devices, such as a D/A converter or a console panel, for measuring the internal conditions of the control circuit. Moreover, the method of the present invention can be controlled by a software technique, without needing any additional devices except an indicator, presenting an advantage from the standpoint of manufacturing cost. Furthermore, when the present invention is applied to a digital control circuit, a voltmeter which has generally been used for the adjustment of this sort may be simply employed instead of the light-emitting indicator consisting of an incandescent lamp or a light-emitting diode.

As many widely different embodiments of the present invention may be constructed without departing from the spirit and scope of the present invention, it should be understood that the present invention is not limited to the specific embodiments described in this specification, except as defined in the appended claims.

I claim:

1. A method of indicating a basic air-fuel ratio condition of an internal combustion engine having an air-fuel ratio feedback control system which controls, in response to an air-fuel ratio correction signal, the air-fuel ratio of the mixture supplied to said engine, said air-fuel ratio correction signal being gradually increased or decreased in accordance with the output of an exhaust gas sensor which detects the concentration of a predetermined component contained in the exhaust gas of said engine, said method comprising the steps of:

generating a signal having an average value of said air-fuel ratio correction signal;

comparing said average air-fuel ratio correction signal with a plurality of predetermined values to discriminate a range in which said average signal is positioned among a plurality of ranges specified by said plurality of predetermined values; and producing an output signal which represents said discriminated range and energizes an indicator to inform an operator of the basic air-fuel ratio condition of said engine.

2. A method as claimed in claim 1, wherein said output signal producing step includes a step of producing pulse signals having a duty cycle which represents said discriminated range and energizes an indicator to inform the operator of the basic air-fuel ratio condition of said engine.

3. A method as claimed in claim 2, wherein said indicator comprises a light-emitting element and including the step of turning on and off said light-emitting element in response to said pulse signals to inform the operator of the basic air-fuel ratio condition.

4. A method as claimed in claim 1, 2 or 4 wherein said method further comprises the steps of:

detecting whether the throttle valve of said engine is at the idling position;

inhibiting said signal generating step, said comparing step and said output signal producing step from being carried out when the throttle valve is not at the idling position; and producing a signal for energizing said indicator to inform the operator that said engine is not in the idling condition.

5. An apparatus for indicating a basic air-fuel ratio condition of an internal combustion engine having an air-fuel ratio feedback control system which controls, in response to an air-fuel ratio correction signal, the air-fuel ratio of the mixture supplied to said engine, said apparatus comprising:

an exhaust gas sensor for detecting the concentration of a predetermined component contained in the exhaust gas and for producing an output representative thereof;

processing means for gradually increasing or decreasing said air-fuel ratio correction signal in accordance with the output of the exhaust gas sensor, generating a signal having an average value of said air-fuel ratio correction signal, comparing said average air-fuel ratio correction signal with a plurality of predetermined values to discriminate a range in which said average signal is positioned among a plurality of ranges specified by said plurality of predetermined values, and producing an output signal which represents said discriminated range; and means responsive to said output signal for indicating to an operator the basic air-fuel ratio condition of said engine.

6. An apparatus as claimed in claim 5, wherein said output signal includes pulse signals having a duty cycle which represents said discriminated range and energizes the indicator to inform the operator of the basic air-fuel ratio condition of said engine.

7. An apparatus as claimed in claim 6, wherein said indicating means includes a light-emitting element and wherein said pulse signals turn said light-emitting element on and off to inform an operator of the basic air-fuel ratio condition.

8. An apparatus as claimed in claim 5, 6 or 7 further including means for detecting whether the throttle valve of said engine is at the idling position, and wherein the processing means inhibits the generation of the signal having an average value and the comparison of the average signal when the throttle valve is not at the idling position, and wherein the processing means produces a signal for energizing said indicating means to inform the operator that said engine is not in the idling condition.

* * * * *